(12) United States Patent
Carloni et al.

(10) Patent No.: US 7,644,973 B2
(45) Date of Patent: Jan. 12, 2010

(54) ANTI-CHUCKING TAILGATE

(75) Inventors: Shannon Carloni, Dearborn Heights, MI (US); Jeff Firzlaff, Royal Oak, MI (US); Scott Miller, Canton, MI (US); Chris Bustamante, Dearborn, MI (US); James Posa, Grosse Ile, MI (US)

(73) Assignee: Ford Global Technologies, LLC, Deerborn, MI (US)

( * ) Notice: Subject to any disclaimer, the term of this patent is extended or adjusted under 35 U.S.C. 154(b) by 497 days.

(21) Appl. No.: 11/677,894

(22) Filed: Feb. 22, 2007

(65) Prior Publication Data
US 2008/0206033 A1 Aug. 28, 2008

(51) Int. Cl.
*B60J 7/00* (2006.01)
(52) U.S. Cl. .................................... 296/57.1
(58) Field of Classification Search ............... 296/57.1, 296/50, 52, 53, 56, 61, 62
See application file for complete search history.

(56) References Cited

U.S. PATENT DOCUMENTS

| 2004/0032141 A1 | 2/2004 | Moyna |
| 2005/0127701 A1 | 6/2005 | Libby |
| 2005/0253398 A1 | 11/2005 | Schubring et al. |

*Primary Examiner*—Joseph D Pape
(74) *Attorney, Agent, or Firm*—Greg Brown; Jerome R. Drouillard

(57) ABSTRACT

An anti-chucking device (14) for a tailgate assembly (12) for a vehicle (10), includes a bracket member (36) and a striker member (38). The striker member (38) engages the bracket member (36) and prevents the tailgate assembly (12) from moving in a lateral direction on the vehicle (10) when the tailgate assembly (12) is moved to an open position and a closed position. The bracket member (36) includes a first pair of tabs (50) and a second pair of tabs (52). The first pair of tabs (50) extends from the second pair of tabs (52) by a predetermined angle. The first pair of tabs (50) defines a first slot (60), and the second pair of tabs (52) defines a second slot (62). The striker member (38) pivots between the first slot (60) and the second slot (62), with the tailgate assembly (12) moving between open and closed positions.

20 Claims, 3 Drawing Sheets

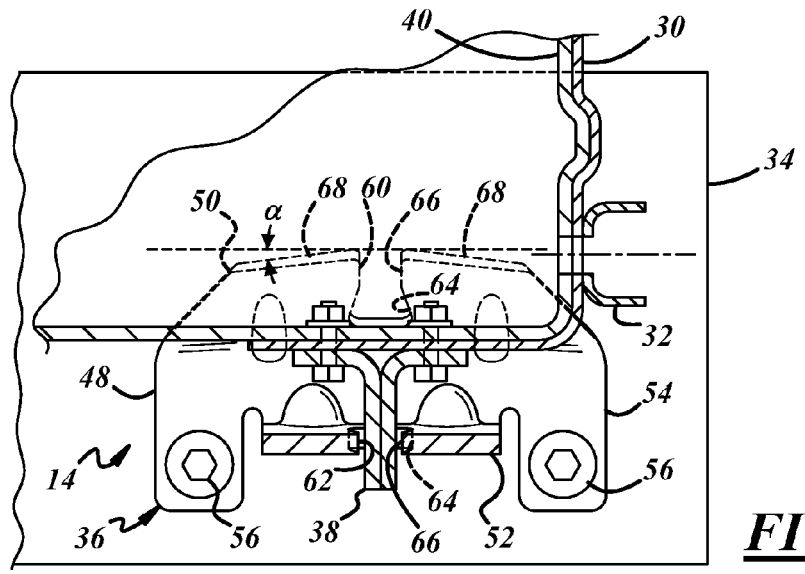
FIG. 5
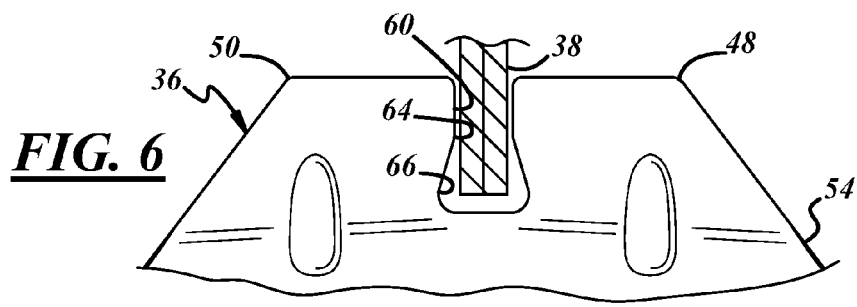
FIG. 6
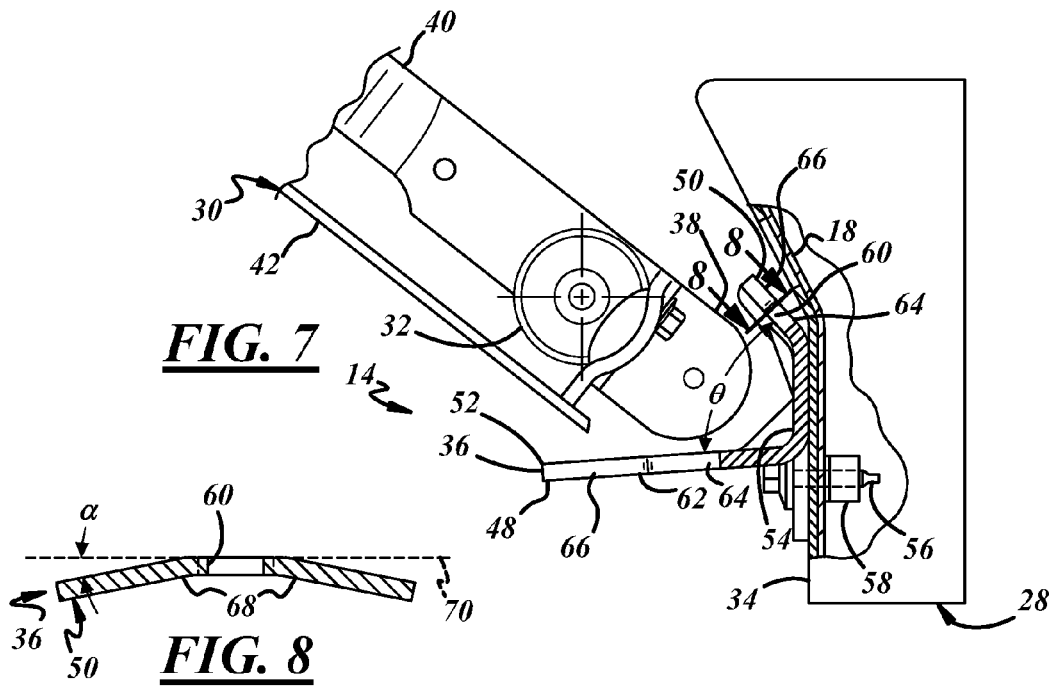
FIG. 7
FIG. 8

ANTI-CHUCKING TAILGATE

TECHNICAL FIELD

The present invention relates generally to vehicles with tailgates, and more particularly to an anti-chucking device preventing a tailgate from moving in a side-to-side motion when the tailgate is moved to open and closed positions.

BACKGROUND

Auto manufacturers are investigating anti-chucking devices for preventing the side-to-side motion of the tailgate and minimizing damage to tailgate hinges and D-pillar structures. Chucking can produce a "hammer effect" that damages the vehicle when the tailgate has a generally large mass and when the vehicle is driven under harsh conditions.

Existing anti-chucking devices prevent side-to-side motion of the tailgate when the tailgate is in only one position, such as a fully closed position. In this respect, current anti-chucking devices do not prevent side-to-side motion of the tailgate in both open and closed positions. It is understood that a vehicle can be driven with the tailgate moved to the open position or the closed position. For instance, the tailgate can remain open when transporting cargo that extends longer than the cargo box, such as lumber.

It is therefore desirable to provide an anti-chucking device that prevents damage to the vehicle when the tailgate is in both open and closed positions.

SUMMARY OF THE INVENTION

An anti-chucking device for a tailgate assembly for a vehicle is provided. The anti-chucking device includes a bracket member and a striker member. The striker member engages the bracket member and prevents the tailgate assembly from moving in a lateral direction on the vehicle when the tailgate assembly is moved to an open position and a closed position. The bracket member includes a first pair of tabs and a second pair of tabs. The first pair of tabs extends from the second pair of tabs by a predetermined angle. The first pair of tabs defines a first slot, and the second pair of tabs defines a second slot. The striker member pivots between the first slot and the second slot, with the tailgate assembly moving between open and closed positions.

One advantage of the invention is that an anti-chucking device for a tailgate assembly is provided that prevents damage to a vehicle frame, such as a box D-pillar structure, when the tailgate assembly is moved to open and closed positions.

Another advantage of the invention is that an anti-chucking device is provided that manages water and prevents corrosion of the vehicle, as well as the anti-chucking device itself.

Yet another advantage of the invention is that an anti-chucking device is provided that has self-guiding features for operating within manufacturing and assembly tolerances.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 5 is a cross-sectional view of the tailgate assembly shown in FIG. 4, as taken along line 5-5, illustrating the tailgate assembly in a closed position;

FIG. 6 is a plan view of the bracket shown in FIG. 4, as taken along line 6-6, illustrating the anti-chucking device in an open position;

FIG. 7 is a cross-sectional view of the tailgate assembly shown in FIG. 2, and taken along line 4-4 illustrating the tailgate assembly in an intermediate position; and FIG. 8 is a cross-sectional view of the bracket shown in FIG. 7, as taken along line 8-8, illustrating a pair of canted arms defining a first slot.

DETAILED DESCRIPTION OF THE INVENTION

Figure 1:
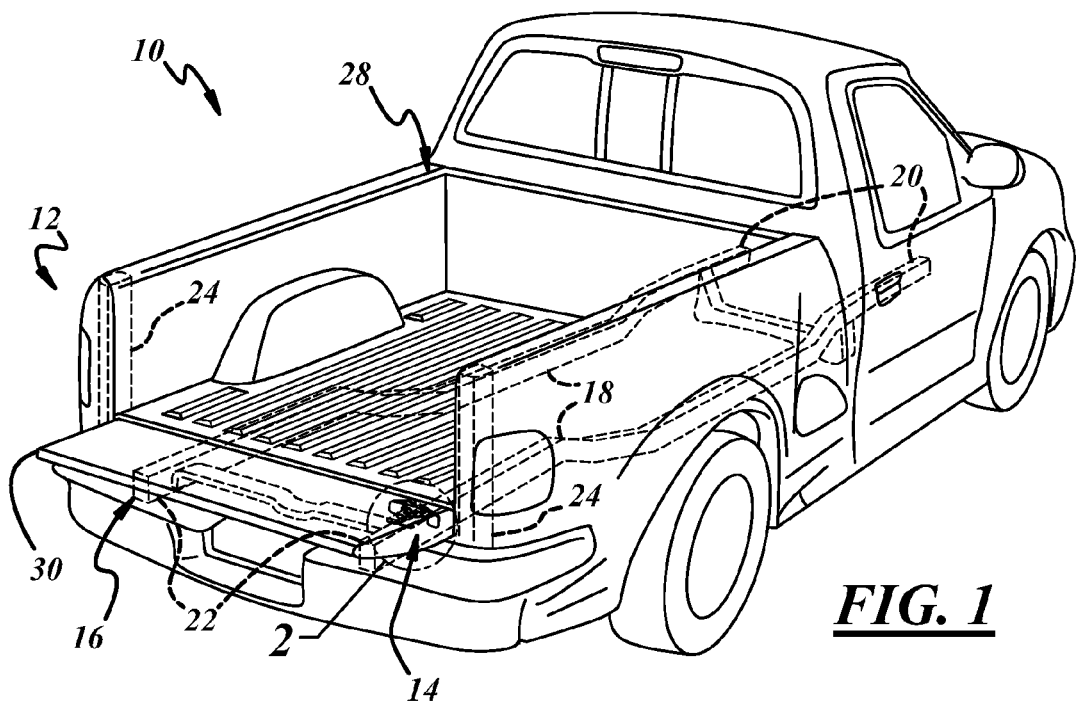
FIG. 1 is a perspective view of a vehicle having a tailgate assembly with an anti-chucking device, according to one embodiment of the invention.

In the following figures, the same reference numerals are used to identify the same components in the various views.

Referring to FIG. 1, there is shown a vehicle 10 having a tailgate assembly 12 ("assembly") with an anti-chucking device 14, according to one embodiment of the claimed invention. As detailed below, the anti-chucking device 14 prevents the assembly 12 from moving in a side-to-side motion, which can otherwise create a "hammer effect" damaging the vehicle 10. It is contemplated that more than one anti-chucking device 14 can be utilized for various body structures pivotally attached to the vehicle 10.

The vehicle 10 includes a vehicle frame 16 and the assembly 12 with the anti-chucking device 14. The vehicle frame 16 includes a pair of rails 18 with a front portion 20 and a rear portion 22.

The assembly 12 includes a cargo box 28, a tailgate 30, and the anti-chucking device 14. The cargo box 28 is attached to the rear portion 22 of rails 18 and includes a pair of D-pillars 24 extending substantially perpendicularly from the rails 18. The tailgate 30 is pivotally attached to the D-pillars 24 by a pair of hinge members 32 (as shown in FIG. 2).

Figure 2:
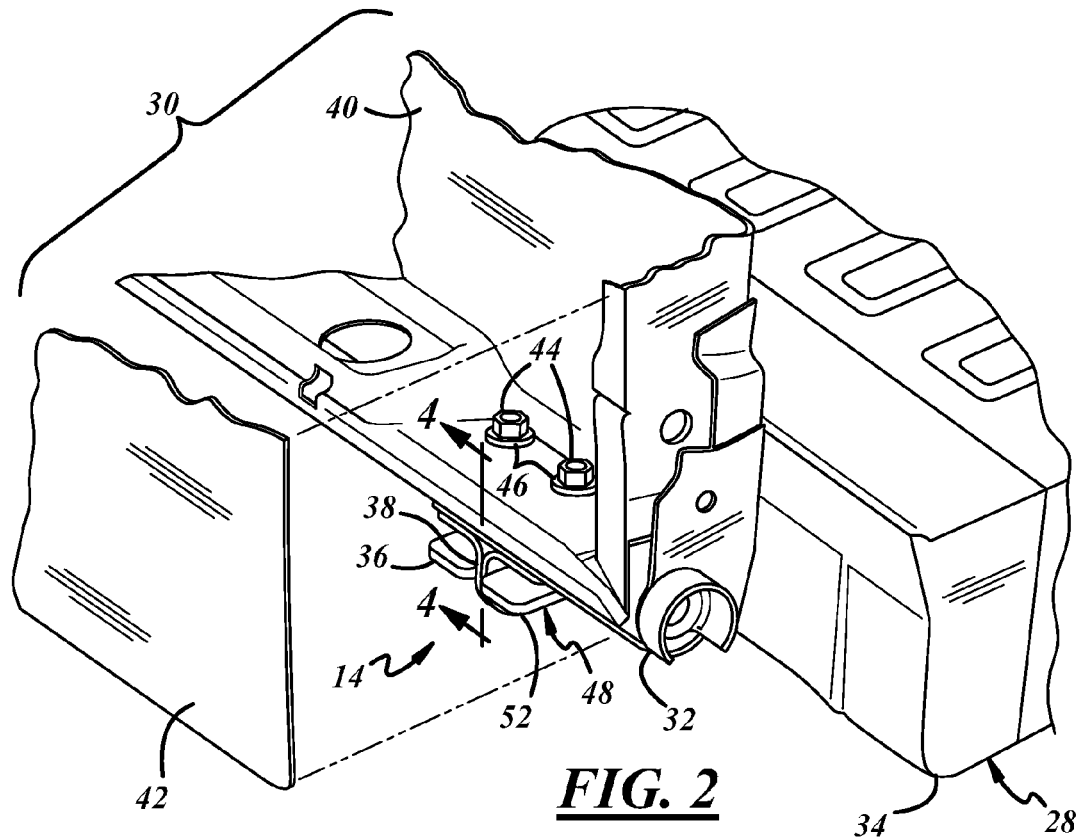
FIG. 2 is an enlarged partially exploded view of the tailgate assembly shown in FIG. 1, as taken from circle 2, illustrating the anti-chucking device with the tailgate in a fully closed position.
Figure 3:
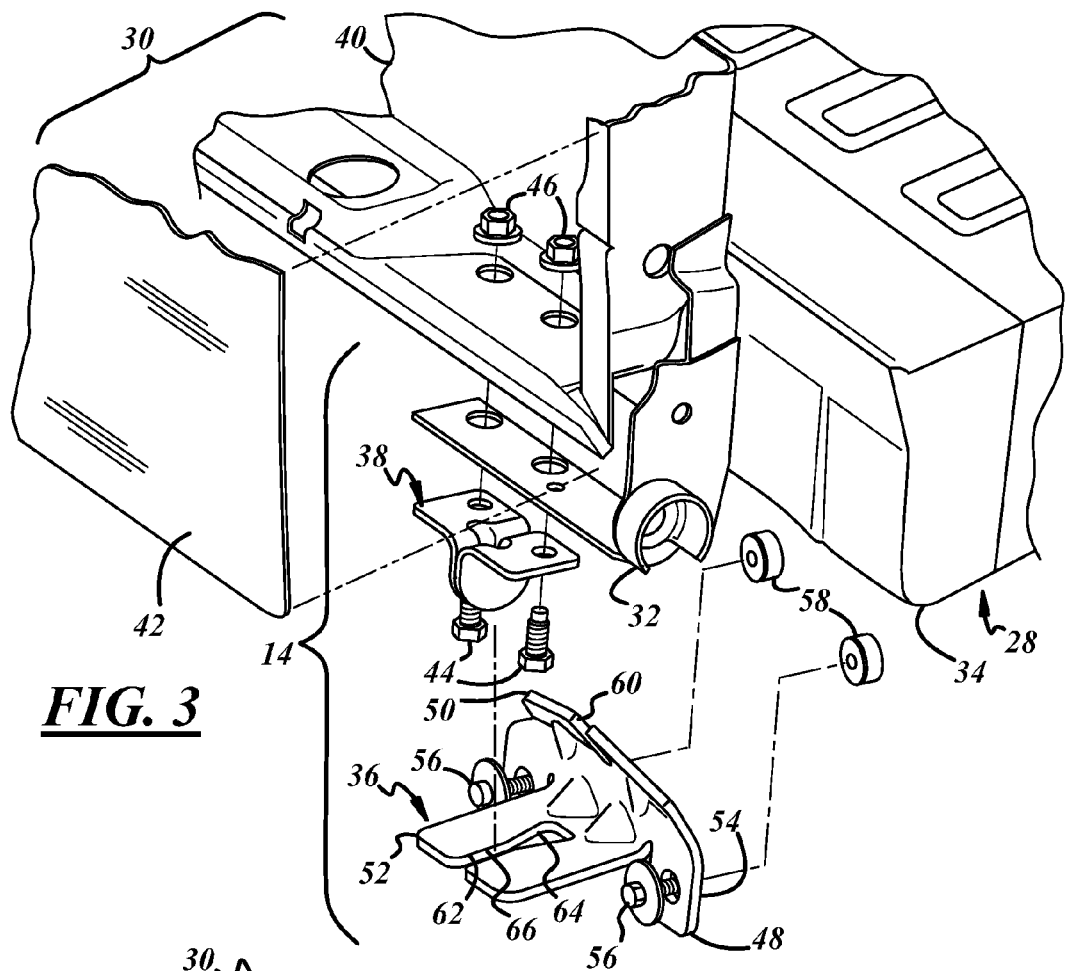
FIG. 3 is a fully exploded view of the tailgate assembly shown in FIG. 2.

As shown in FIGS. 2 and 3, the cargo box 28 includes a rear sill 34 with one or more anti-chucking devices 14. Each anti-chucking device 14 includes a bracket member 36 and a striker member 38. The bracket member 36 is attached to the rear sill 34 of the cargo box 28, and the striker member 38 extends from the tailgate 30. The tailgate 30 is formed from an inner panel 40 and an outer panel 42. In the illustrated embodiment, the striker member 38 is attached to the inner panel 40 by a pair of bolt members 44 and nut members 46. It is contemplated that the striker member 38 and the bracket member 36 can be attached to a variety of other suitable portions of the vehicle 10 by various suitable fastening devices. For example, the anti-chucking device 14 can instead be attached to a top portion of a liftgate with the top portion pivotally attached to the vehicle 10.

Figure 4:
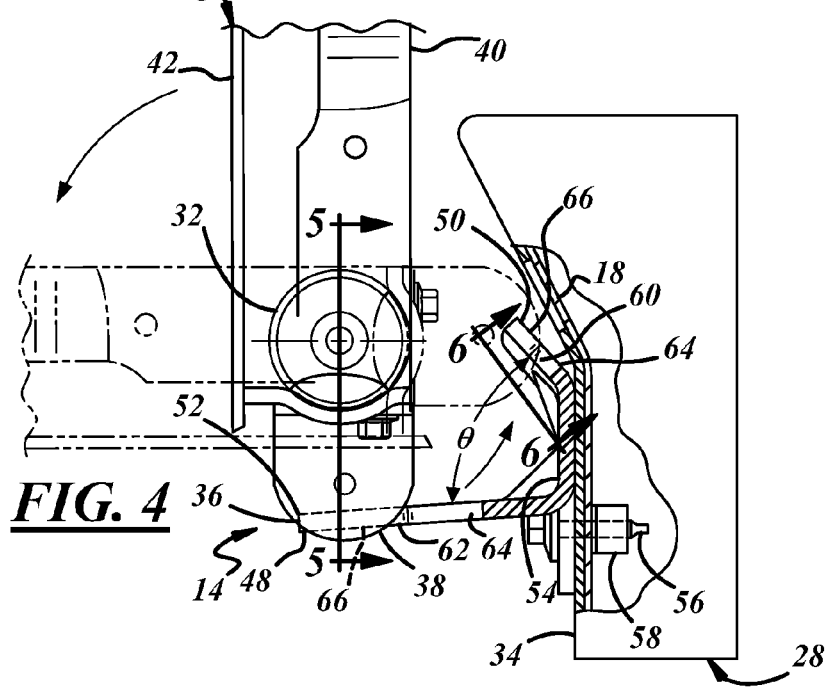
FIG. 4 is a cross-sectional view of the tailgate assembly shown in FIG. 2, as taken along line 4-4, illustrating the tailgate assembly in fully open and fully closed positions.

With attention to FIGS. 3 through 5, the bracket member 36 is a one-piece stamped construction 48 with a first pair of tabs 50, a second pair of tabs 52, and a mounting plate portion 54. The mounting plate portion 54 extends between the first pair of tabs 50 and the second pair of tabs 52. The mounting plate portion 54 is attached to the rear sill 34 of the cargo box 28 by a pair of bolt members 56 and nut members 58. The bracket member 36 can have other suitable constructions and be attached to the vehicle 10 by other suitable fastening mechanisms as desired.

The first pair of tabs 50 and the second pair of tabs 52 respectively define a first slot 60 and a second slot 62, which receive the striker member 38 when the tailgate 30 is in open and closed positions.

As shown in FIGS. 3 through 6, the first slot 60 and second slot 62 each have an enlarged portion 64 and a narrowed portion 66. The enlarged portion 64 of each slot 60, 62 is adjacent to the mounting plate portion 54 so as to readily receive striker member 38 and guide the same into the narrowed portion 66 of the slots 60, 62. Striker member 38 has a round outer perimeter (as best shown in FIGS. 4 and 7) for facilitating entry into enlarged portion 64 of slots 60, 62.

The striker member 38 is positioned within the narrowed portion 66 of the slots 60, 62 when the tailgate 30 is moved respectively to the fully open and fully closed positions. In this way, the striker member 38 and bracket member 36 support the tailgate 30 in a lateral side-to-side direction and prevent the tailgate 30 from damaging the hinge members 32 and the D-pillars 24. As shown in FIG. 4, the first pair of tabs 50 extends from the second pair of tabs 52 by a predetermined angle θ for engaging the striker member 38 when the tailgate 30 is moved to fully open and fully closed positions. In the illustrated embodiment, the second pair of tabs 52 extends substantially perpendicularly from the rear sill 34 for receiving the striker member 38 when the tailgate 30 is in the closed position.

Referring now to FIG. 7, the tailgate 30 is movable to an intermediate position between the fully open and fully closed positions. In this intermediate position, the striker member 38 is positioned between the first pair of tabs 50 and the second pair of tabs 52. In this respect, the striker member 38 is offset from the first slot 60 and the second slot 62 and thus movable in a lateral direction. This feature is beneficial for removing the tailgate 30 when it is moved to the intermediate position.

With attention to FIG. 8, the first pair of tabs 50 is a pair of canted arms 68 that direct water away from the vehicle 10 and assist in minimizing corrosion at the interface between the bracket member 36 and the rear sill 34. In particular, the canted arms 68 are offset from a lateral reference plane 70 by a predetermined angle α so as to direct water off the canted arms 68 and away from first slot 60 and the rear sill 34.

Referring back to FIG. 4, second pair of tabs 52 is offset downward from a horizontal reference plane 72 by a predetermined angle φ for clearing water and debris that may otherwise collect on the second pair of tabs 52.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. An anti-chucking device for a tailgate assembly for a vehicle, comprising:
    a bracket member; and
    a striker member engaging said bracket member and preventing said tailgate assembly from moving in a lateral direction on said vehicle when said tailgate assembly is in an open position and a closed position;
    said bracket member having a first pair of tabs and a second pair of tabs;
    said first pair of tabs extending from said second pair of tabs by a predetermined angle;
    said first pair of tabs defining a first slot;
    said second pair of tabs defining a second slot; and
    said striker member pivoting between said first slot and said second slot with said tailgate assembly moving between said open position and said closed position.

2. The anti-chucking device recited in claim 1 wherein said bracket member is a one-piece construction.

3. The anti-chucking device recited in claim 2 wherein said one-piece construction includes a mounting plate portion extending between said first pair of tabs and said second pair of tabs, with said mounting plate portion attached to said vehicle.

4. A tailgate assembly for a vehicle, comprising:
    a cargo box;
    a tailgate pivoting on said cargo box;
    said tailgate pivoting between an open position and a closed position; and
    said anti-chucking device recited in claim 1;
    said anti-chucking device preventing said tailgate from moving in a lateral direction on said cargo box when said tailgate is in said open position and said closed position;
    said bracket member attached to said cargo box;
    said striker member attached to said tailgate.

5. The tailgate assembly recited in claim 4 wherein said tailgate includes a tailgate outer panel and a tailgate inner panel with said striker member attached to said tailgate inner panel.

6. A vehicle, comprising:
    a vehicle frame having a pair of rails with a front end portion and a rear end portion;
    a pair of D-pillars extending from said rear end portion of said rails;
    said tailgate assembly recited in claim 4;
    said cargo box attached to said vehicle frame;
    said tailgate pivotally attached to said D-pillars;
    said anti-chucking device preventing said tailgate from moving in a lateral direction between said D-pillars.

7. The vehicle recited in claim 6 wherein said tailgate is pivotally attached to said D-pillars by a pair of hinge members.

8. The vehicle recited in claim 6 wherein one of said first pair of tabs and said second pair of tabs extends substantially perpendicularly from said cargo box.

9. An anti-chucking device for a tailgate assembly for a vehicle, comprising:
    a bracket member having a pair of canted arms directing water away from said vehicle; and
    a striker member engaging said bracket member and preventing said tailgate assembly from moving in a lateral direction on said vehicle when said tailgate assembly is in an open position and a closed position;
    said bracket member having a first pair of tabs and a second pair of tabs;
    said first pair of tabs extending from said second pair of tabs by a predetermined angle;
    said first pair of tabs formed from said canted arms and defining a first slot;
    said second pair of tabs defining a second slot; and
    said striker member pivoting between said first slot and said second slot with said tailgate assembly moving between said open position and said closed position;
    said pair of canted arms defining said first slot.

10. The anti-chucking device recited in claim 9 wherein said canted arms extend from a lateral reference plane by a predetermined angle.

11. The anti-chucking device recited in claim 10 wherein said bracket member is a one-piece construction.

12. The anti-chucking device recited in claim 11 wherein said one-piece construction includes a mounting plate portion extending between said first pair of tabs and said second pair of tabs, with said mounting plate portion attached to said vehicle.

13. A tailgate assembly for a vehicle, comprising:
a cargo box;
a tailgate pivoting on said cargo box;
said tailgate pivoting between an open position and a closed position; and
said anti-chucking device recited in claim 9;
said anti-chucking device preventing said tailgate from moving in a lateral direction on said cargo box when said tailgate is in said open position and said closed position;
said bracket member attached to said cargo box;
said striker member attached to said tailgate.

14. The tailgate assembly recited in claim 13 wherein said tailgate includes a tailgate outer panel and a tailgate inner panel with said striker member attached to said tailgate inner panel.

15. A vehicle, comprising:
a vehicle frame having a pair of rails with a front end portion and a rear end portion;
a pair of D-pillars extending from said rear end portion of said rails;
said tailgate assembly recited in claim 13;
said cargo box attached to said vehicle frame;
said tailgate pivotally attached to said D-pillars;
said anti-chucking device preventing said tailgate from moving in a lateral direction between said D-pillars.

16. The vehicle recited in claim 15 wherein said tailgate is pivotally attached to said D-pillars by a pair of hinge members.

17. The vehicle recited in claim 15 wherein one of said first pair of tabs and said second pair of tabs is offset from a horizontal reference plane by a predetermined angle for clearing debris thereon.

18. An anti-chucking device for a tailgate assembly for a vehicle, comprising:
a bracket member; and
a striker member engaging said bracket member and preventing said tailgate assembly from moving in a lateral direction on said vehicle when said tailgate assembly is in an open position and a closed position;
said bracket member having a first pair of tabs and a second pair of tabs;
said first pair of tabs extending from said second pair of tabs by a predetermined angle;
said first pair of tabs defining a first slot;
said second pair of tabs defining a second slot; and
a striker member pivoting between said first slot and said second slot with said tailgate assembly moving between said open position and said closed position;
said first slot having a first enlarged portion adjacent to said second pair of tabs for receiving said striker member;
said second slot having a second enlarged portion adjacent to said first pair of tabs for receiving said striker member;
said striker member having a rounded perimeter for facilitating entry into said first slot and said second slot.

19. A tailgate assembly for a vehicle, comprising:
a cargo box;
a tailgate pivoting on said cargo box;
said tailgate pivoting between an open position and a closed position; and
said anti-chucking device recited in claim 18;
said anti-chucking device preventing said tailgate from moving in a lateral direction on said cargo box when said tailgate is in said open position and said closed position;
said bracket member attached to said cargo box;
said striker member attached to said tailgate.

20. A vehicle, comprising:
a vehicle frame having a pair of rails with a front end portion and a rear end portion;
a pair of D-pillars extending from said rear end portion of said rails;
said tailgate assembly recited in claim 19 with said tailgate pivotally attached to said D-pillars by a pair of hinge members;
said cargo box attached to said vehicle frame;
said tailgate pivotally attached to said D-pillars;
said anti-chucking device preventing said tailgate from moving in a lateral direction between said D-pillars when said tailgate is in said open position and said closed position;
said tailgate movable to an intermediate position and movable in said lateral direction;
said tailgate in said intermediate position between said open position and said closed position with said striker member offset from said first slot and said second slot.

* * * * *